United States Patent
Leighton et al.

(10) Patent No.: US 9,621,347 B2
(45) Date of Patent: Apr. 11, 2017

(54) SYSTEMS AND METHODS FOR SECURELY PROVISIONING THE GEOGRAPHIC LOCATION OF PHYSICAL INFRASTRUCTURE ELEMENTS IN CLOUD COMPUTING ENVIRONMENTS

(71) Applicant: Virtustream IP Holding Company LLC, Bethesda, MD (US)

(72) Inventors: Gregsie Leighton, Alpharetta, GA (US); Vincent George Lubsey, Snellville, GA (US); Kevin Reid, Bethesda, MD (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 0 days.

(21) Appl. No.: 14/843,776

(22) Filed: Sep. 2, 2015

(65) Prior Publication Data
US 2016/0065589 A1 Mar. 3, 2016

Related U.S. Application Data
(60) Provisional application No. 62/045,434, filed on Sep. 3, 2014.

(51) Int. Cl.
*H04L 9/30* (2006.01)
*G06F 9/455* (2006.01)
(Continued)

(52) U.S. Cl.
CPC ............ *H04L 9/30* (2013.01); *G06F 9/45558* (2013.01); *G06F 21/64* (2013.01); *G06F 21/83* (2013.01);
(Continued)

(58) Field of Classification Search
None
See application file for complete search history.

(56) References Cited

U.S. PATENT DOCUMENTS

| 6,963,973 | B2 | 11/2005 | Chapman et al. |
| 7,855,679 | B1 | 12/2010 | Braiman |
(Continued)

FOREIGN PATENT DOCUMENTS

| WO | 2013101094 A1 | 7/2013 |
| WO | 2014114699 A1 | 7/2013 |
| WO | PCT/US2015/048148 | 12/2015 |

OTHER PUBLICATIONS

D. E. Denning et al, "Location-Based Authentication: Grounding Cyberspace for Better Security," Computer Fraud & Security, Feb. 1996, pp. 12-16, vol. 1996, No. 2.
(Continued)

*Primary Examiner* — Kaveh Abrishamkar
(74) *Attorney, Agent, or Firm* — Ryan, Mason & Lewis, LLP

(57) ABSTRACT

Systems and methods relating to improved security in cloud computing environments are disclosed. According to one illustrative implementation, a method for provisioning physical geographic location of a physical infrastructure device associated with a hypervisor host is provided. Further, the method may include performing processing to obtain initial geo location data of the device, determining verified geo location data of the device by performing validation, via an attestation service component, of the initial geo location data to provide verified geo location data, and writing the verified geo location data into HSM or TPM space of the hypervisor host.

46 Claims, 6 Drawing Sheets

(51) Int. Cl.
*H04W 4/02* (2009.01)
*H04W 12/10* (2009.01)
*H04L 9/08* (2006.01)
*G06F 21/64* (2013.01)
*G06F 21/83* (2013.01)
*H04L 29/06* (2006.01)

(52) U.S. Cl.
CPC .......... *H04L 9/0872* (2013.01); *H04L 63/123* (2013.01); *H04W 4/02* (2013.01); *H04W 12/10* (2013.01); *G06F 2009/45587* (2013.01); *H04L 63/0876* (2013.01)

(56) References Cited

U.S. PATENT DOCUMENTS

| | | | |
|---|---|---|---|
| 8,489,881 B2 | 7/2013 | Takada et al. | |
| 9,081,989 B2 | 7/2015 | Lie et al. | |
| 2008/0182592 A1 | 7/2008 | Cha et al. | |
| 2009/0063675 A1 | 3/2009 | Faris et al. | |
| 2009/0100260 A1 | 4/2009 | Govindarajan | |
| 2012/0117209 A1* | 5/2012 | Sinha | G06F 21/88 709/221 |
| 2013/0007734 A1* | 1/2013 | McCloy | G06F 9/45558 718/1 |
| 2013/0198797 A1* | 8/2013 | Raghuram | G06F 21/57 726/1 |
| 2013/0212420 A1 | 8/2013 | Lawson et al. | |
| 2013/0238786 A1 | 9/2013 | Khesin | |
| 2013/0263209 A1* | 10/2013 | Panuganty | H04L 43/04 726/1 |
| 2013/0347058 A1* | 12/2013 | Smith | G06F 21/57 726/1 |
| 2014/0108784 A1* | 4/2014 | Pendarakis | H04L 63/062 713/156 |
| 2014/0337921 A1* | 11/2014 | Hanna, Jr. | H04L 63/08 726/3 |

OTHER PUBLICATIONS

Cade Metz, "Google Spans Entire Pianet with GPS-Powered Database," http://www.wired.com/wiredenterprise/2012/09/google-spanner, Sep. 19, 2012, 9 pages.

R. Yeluri et al., "Boundary Contol in the Cloud: Geo-tagging and Asset Tagging" Building the Infastructure for Cloud Security: A Solutions View, Apress, Apr. 2014, pp. 93-121.

M. Kabatnik et al., "Location Stamps for Digital Signatures: A New Service for Mobile Telephone Networks," Networking—ICN 2001, Proceedings of the 1st international Conference on Networking Part II, Lecture Notes in Computer Science, Jul. 2001, pp. 20-30, vol. 2094, Colmar, France.

D. Hanna et al. "Enterprise Security Innovations: How to Strengthen Trust by Adding Location and Proximity Assurance; An Important Development in Next-Generation Security," Intel Corporation, White Paper, 2013, 13 pages.

J. Greene et al., "Intel Trusted Execution Technology: Hardware-Based Technology for Enhancing Server Platform Security," Intel Corporation, White Paper, 2010, 8 pages.

E.K. Banks et al., "Trusted Geolocation in the Cloud: Proof of Conept Implementaton (Draft)" Natonal Institute of Standards and Technology (NIST) Interagency Report 7904, Dec. 2012, 42 pages.

* cited by examiner

SYSTEMS AND METHODS FOR SECURELY PROVISIONING THE GEOGRAPHIC LOCATION OF PHYSICAL INFRASTRUCTURE ELEMENTS IN CLOUD COMPUTING ENVIRONMENTS

CROSS-REFERENCE TO RELATED APPLICATIONS

This application is based upon and claims the benefit of priority from the U.S. Provisional Patent Application No. 62/045,434 filed Sep. 3, 2014. The entire content of this application is herein incorporated by reference in its entirety.

BACKGROUND

Field

The present inventions relate generally to cloud computing and, more specifically, to systems and methods relating to improved security in cloud computing environments.

Description of Related Art

Cloud computing services may be offered at various layers of the software stack. At lower layers, Infrastructure as a Service (IaaS) systems allow users to have access to entire virtual machines (VMs) hosted by the provider, and the users are responsible for providing the entire software stack running inside a VM. At higher layers, Software as a Service (SaaS) systems offer online applications that can be directly executed by the users.

Despite its advantages, cloud computing raises security concerns as users have limited means to ensure confidentiality, integrity, and location of their data and computation resources. Users of cloud computing resources are particularly blind to the location of their data and computing resource location which in many cases must comply with laws that their data and computing resource must reside in a specific physical geographical location.

In order to increase the security and trust associated with communications to a given computer platform, Hardware Security Modules (HSMs) have been used to enable the construction of trusted platforms. An HSM is a coprocessor that is typically affixed to a computer's motherboard. It can create and store cryptographic keys and other sensitive data in its shielded memory and provides ways for platform software to use those services to achieve security goals. A popular HSM in use today is the Trusted Platform Module (TPM) as specified by the Trusted Computing Group.

OVERVIEW OF SOME ASPECTS

Systems and methods for accurately determining and securely provisioning the geographic location of cloud computing physical infrastructure elements are disclosed. Aspects herein also relate to the provision of attested time and physical geographic location to physical and virtual assets associated with a cloud environment's physical hardware. Implementations may also utilize Hardware Security Modules, such as TPMs, to securely store an attestable physical geographic location for such infrastructure. Various implementations utilize these TPMs as a foundation of storage as well as geo/GPS and time information as the input seed data to determine and verify a trusted location of the physical infrastructure element, such as a hypervisor host. Further, a host system's Platform Configuration Registers (PCRs) may be provisioned with the trusted location values, giving an accurate reading of the associated host system physical geographic location. Moreover, such trusted location values may be extended securely to attest to the location of virtual machines running on the hypervisor host.

DETAILED DESCRIPTION OF ILLUSTRATIVE IMPLEMENTATIONS

Figure 1:
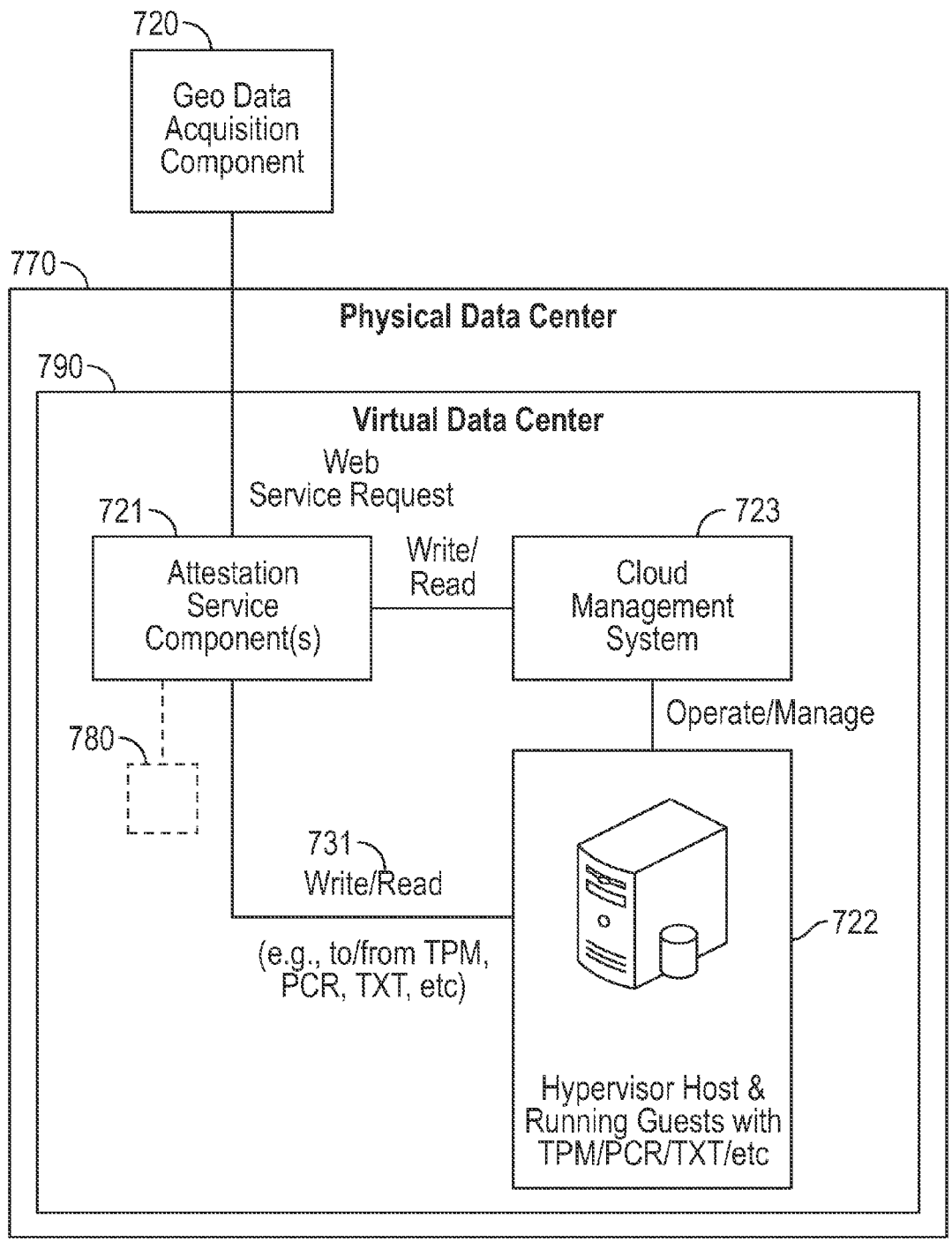
FIG. 1 is a block diagram depicting an illustrative virtual data center including cloud management, geographic location attestation, and provisioning system features, consistent with certain aspects related to the innovations herein.

FIG. 1 is a block diagram depicting an illustrative virtual data center including cloud management, location attestation, and provisioning features, consistent with certain aspects related to the innovations herein. With regard to FIG. 1, an overview of the data center, hypervisor host, geographic location attestation, and provisioning system is shown. This high level diagram outlines the components of one illustrative geographic location attestation system, including connection with measured and telemetry data acquisition elements for obtaining geographic ("geo") or GPS data.

FIG. 1 illustrates some high level relationships and details of a GPS data acquisition system 720 and components within or associated with a physical data center 770 and a virtual data center 790. Referring to FIG. 1, the components associated with the illustrated virtual data center 790 may include one or more attestation service component(s) 721 which may reside on a single computing device or platform, as shown, or be arranged as distributed components. The attestation service component(s) 721 may access or obtain location information, such as geo or GPS information, from a geo data acquisition component or system 720 and, in some implementations, access or involve one or more sub-components or modules 780 for processing of certain trust, time and geographic location information. Further, it is noted that the geographic (geo) data referred to herein may be or include GPS data, and the geographic data acquisition component may be or include a GPS acquisition component, though various innovations herein are not limited to GPS information or components. Examples of geo data and components that may be utilized instead or in connection with GPS information include RFID technologies, wireless access points, mobile cell tower data, and related public IP address space for a physical router in the data center.

Other computing components within or associated with the virtual data center 790 that process information, in connection with the attestation service component(s) 721, may include a cloud management component or system 723 as well as one or more hypervisor host(s) 722. According to certain implementations, each hypervisor host 722 may include at least one host with running guests and associated Hardware Security Modules (HSM), such as Trusted Platform Modules (TPMs) for processing and storage of information. Here, for example, TPM processing and features may be achieved via provisioning of the guest(s) with Intel TXT/TPM technology. With regard to various operations of systems and methods herein, the attestation service component(s) 721 may perform read/write operations 731, such as those involving TPM values, with the hypervisor host(s) 722 and/or the operating systems or software of guests therein.

As set forth below, such systems may be configured to overcome various challenges associated with establishing accurate and true geographic location information, such as drawbacks related to the frequency of attestation required and interruption to processing often performed to provide such attestation. Systems and methods herein may overcome such drawbacks by obtaining, determining and/or processing timing and geographic data (geo data) of higher integrity, as well as via performing processing associated with improved policies around such data. Further, certain implementations may also utilize processing involving governance, risk, and compliance (GRC) system aspects and/or compute running features to address such drawbacks in existing solutions where compliance and the state of risk in an environment including geography is not considered during policy enforcement and attestation.

Figure 2:
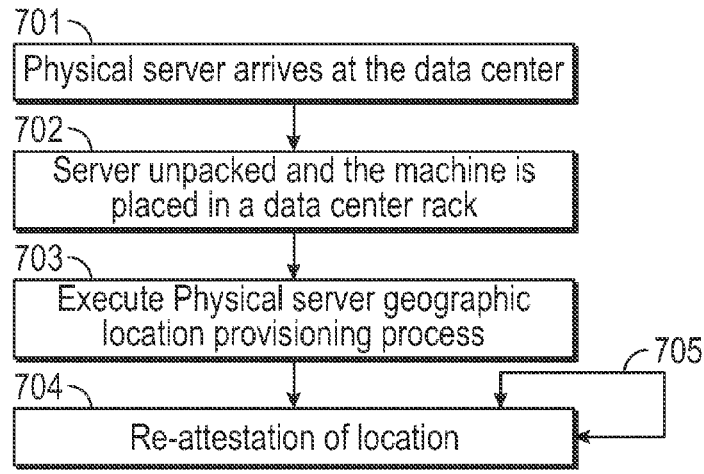
FIG. 2 is a high level flow diagram of an illustrative provisioning process for a physical server, consistent with certain aspects related to the innovations herein.

FIG. 2 is a high level flow diagram of an illustrative provisioning process for a newly-deployed physical server, consistent with certain aspects related to the innovations herein. In FIG. 2, an illustrative process for managing and provisioning a physical server with verified geo location data over its life cycle is shown. According to certain implementations below, for example, such verified geo location data may be provided to and read from Trusted Platform Modules in the hypervisor hosts in connection with processing and validating initial geo location data.

FIG. 2 depicts a high level overview of an illustrative provisioning process over a server life cycle, starting from initial deployment. Here, for example, the provisioning process may include arrival of a physical server or machine at a data center 701, placement of the physical device in a physical data center rack 702, as well as performing (or initiating) a geographic location provisioning process 703 as set forth in more detail in FIGS. 6-8, below. Further, according to implementations herein, the geographic location provisioning process may be performed via an attached connection to a network. Once such provisioning process is completed, the physical server may enter into operational use in the center and be handled using the attestation and provisioning functionality herein to confirm physical location of the device. Again, exemplary attestation and provisioning is set forth in more detail in connection with FIGS. 6-8, below. Such provisioning processes may also include re-attesting the location of the physical server, at 704.

Finally, repeated attestation of the device's location may be performed, at 705, such as periodically based on a system defined frequency and/or when other triggers are initiated or occur.

Figure 3:
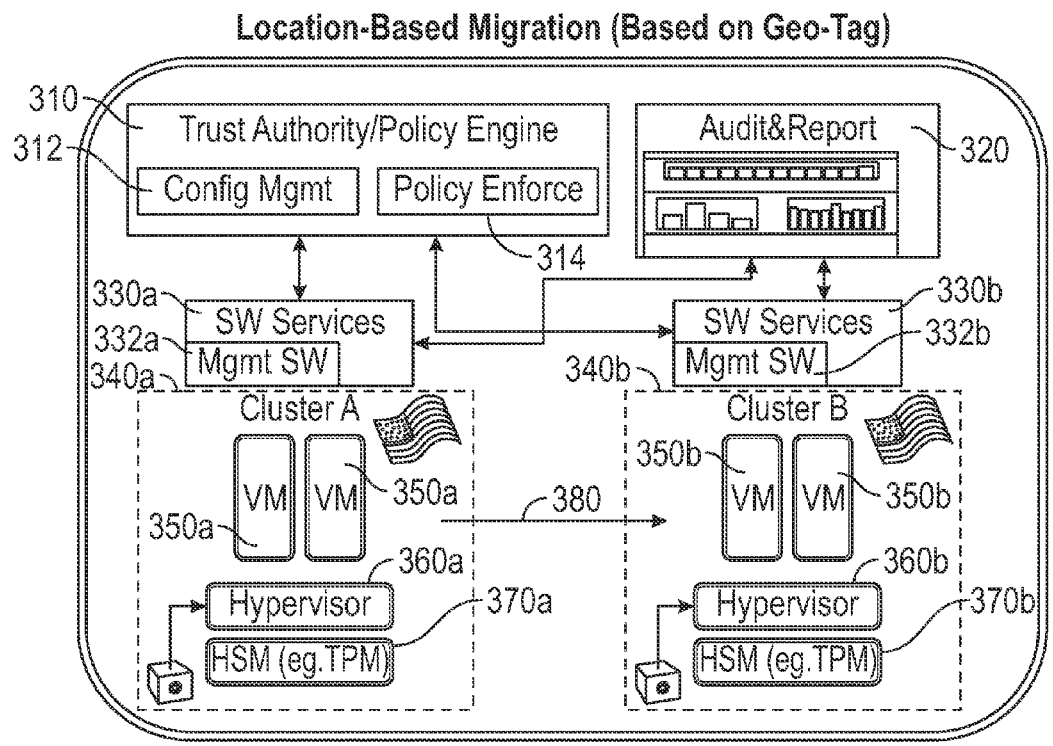
FIG. 3 is a diagram depicting illustrative virtual machine geographical policy management and enforcement features consistent with certain aspects related to the innovations herein.

FIG. 3 is a diagram showing elements and features associated with illustrative implementations of location-based migration, consistent with certain aspects related to the innovations herein. FIG. 3 serves to illustrate aspects and functionality of various geographic policy management and enforcement innovations herein based on geographic data, as applied to virtual machines within the data centers being used. Referring to FIG. 3, various components involved with location-based migration implementations herein are shown, including a trust authority/policy engine 310, an audit and report component 320, cluster A 340A, cluster B 340B, first software services 330A associated with cluster A, second software services 330B associated with cluster B, first virtual machines 350A associated with cluster A, second virtual machines 350B associated with cluster B, as well as hypervisors 360A, 360B and HSM components 370A, 370B, such as TPM/PCR/TXT components. The trust authority/policy engine 310 may further comprise a configuration management subcomponent 312 and a policy enforcement subcomponent 314. Further, each of the first and second software services 330A, 330B may include associated management software subcomponents 332A, 332B for managing the associated virtual infrastructure.

The trust authority/policy engine 310 may provide instruction and control to the first software services 330A associated with cluster A and the second software services 330B associated with cluster B, for example, with regard to managing the configuration 312 of the clusters and resources as well as enforcing policy 314 as to which virtual machines may be utilized for the various processing, storage and operations being performed. Additionally, the audit and report component 320 may be coupled to the first software services 330A and the second software services 330B for purposes of measuring risk and compliance during the entire life cycle of the virtual infrastructure.

Moreover, during a compute migration 380, geo fencing policies may be checked to ensure that the computing workload can launch in the target geographic location. If the workload is not allowed to be transferred to the new location, the computing resource migration will not be allowed by the cloud management system based on the defined geo fencing policies.

Additionally, FIG. 3 helps illustrate various policy and enforcement aspects of systems or methods herein, which may be performed in connection with the trust authority/policy engine 310. Among other things, during management of the virtual environment using the virtualization cloud management software, a set of allowed geographic location tag(s), as associated with one or more locations, may be configured as a policy to specify and/or limit where the virtual machine can launch or perform computing operations. Here, for example, management and control of where virtual machines may launch or perform computing operations may be performed based on the organization and/or owner of the computing resource's legal and/or compliance related requirements as stored within or processed via the authority/policy engine 310.

Figure 4:
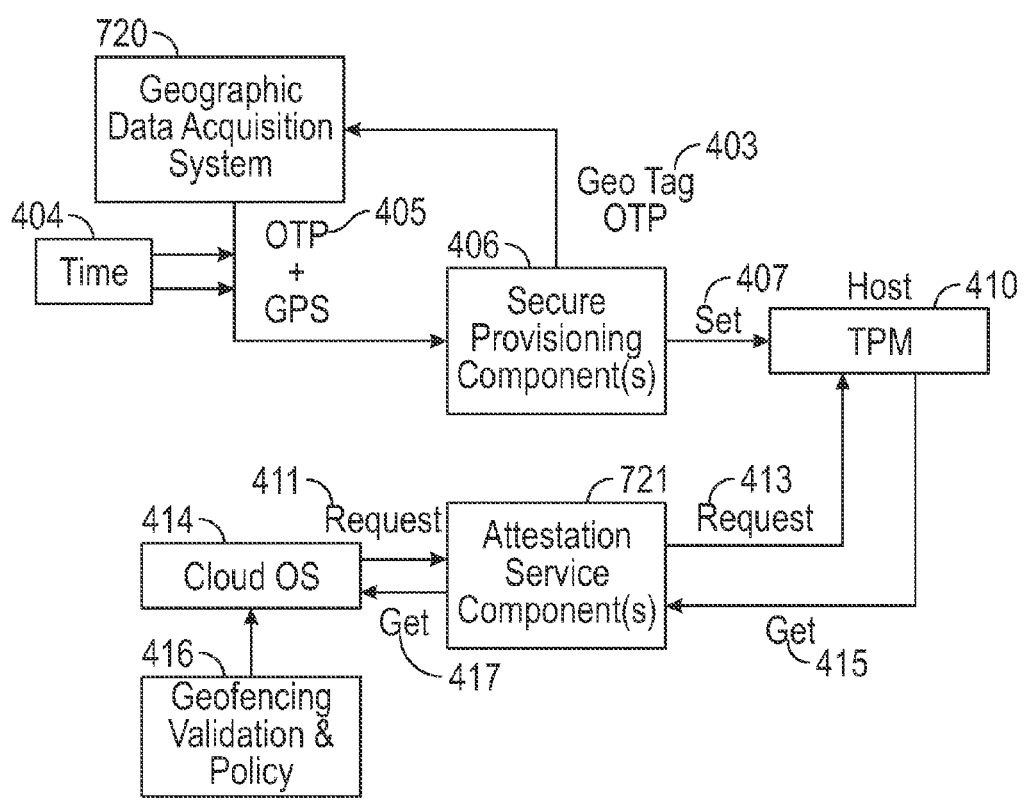
FIG. 4 is a diagram of illustrative virtual machine geographical policy management and enforcement processing consistent with certain aspects related to the innovations herein.

FIG. 4 is a diagram depicting illustrative location provisioning and attestation/policy management and enforcement features consistent with certain aspects related to the innovations herein. FIG. 4 illustrates various flows of information between the GPS acquisition system or component 720, a timing component 404, a secure provisioning system or component 406, a hypervisor host 722 which may have a TPM component 410, the attestation service component(s) 721, the cloud operating system 414, and an associated geofencing validation and policy element or component 416. With regard to providing the hypervisor host with verified location information, the secure provisioning system or component 406 may issue, at 403, a geotag request with a verification code such as a one time password (OTP) to the GPS acquisition system 720. In response to the geotag request, the GPS acquisition system 720 may provide the initial geo location information, along with time information from the timing component 404 and the OTP code 405 for verification, back to the secure provisioning system or component 406. In accordance with innovations set forth elsewhere herein, the secure provisioning system or component 406 may determine or perform processing to obtain the verified geo location data derived from this information. The secure provisioning system or component 406 may then transmit/set, at 407, the verified geo location data into the TPM 410 of the hypervisor host 722.

With regard to the processing related to requesting and confirming such location information, the cloud operating system 414 first issues, at 411, a request for confirmation regarding physical virtual machine(s) location. This request is issued to the attestation service component(s) 721 and may, in some implementations, be associated with verifying consistency of such location data with geofencing validation and policy information 416. Next, the attestation service component(s) 721 issues a corresponding request 413 to obtain the verified geo location information from the hypervisor host 722, which may be stored e.g. in a PCR of the TPM. The attestation service component(s) 721 then obtains, at 415, the verified geo location information, and provides it to the cloud operating system, at 417.

Figure 5:
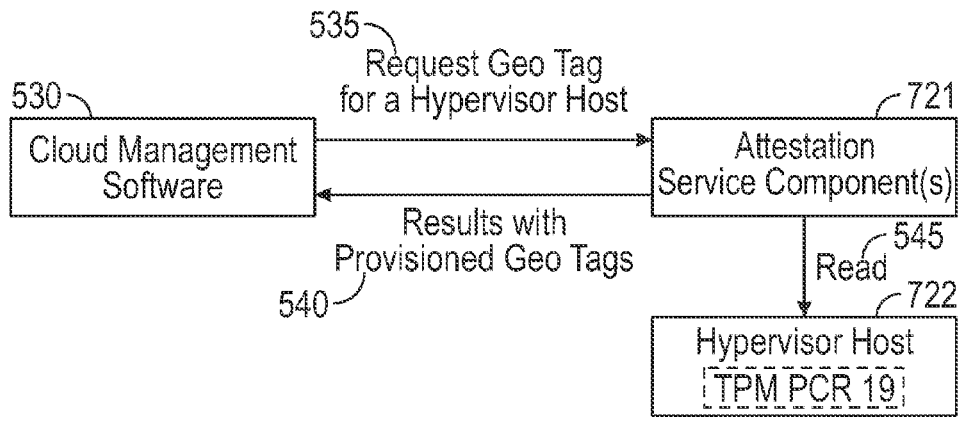
FIG. 5 is a block diagram illustrating high level aspects of requesting and providing geo tag information for a hypervisor host consistent with certain aspects related to the innovations herein.

FIG. 5 is a block diagram illustrating high level aspects of requesting and providing geo tag information for a hypervisor host consistent with certain aspects related to the innovations herein. Referring to FIG. 5, cloud management software 530 first makes a request, at 535, to the attestation component(s) 721, for geo tag information regarding a hypervisor host. Next, the attestation service component(s) 721 performs a read operation, at 545, of the hypervisor host 722 to obtain previously provisioned geo tag data regarding the server or device in question, such as from a PCR of the TPM. The attestation service component(s) 721 then transmit the requested geographic information results with the provisioned geo tags, at 540, to the cloud management software 530.

Figure 6:
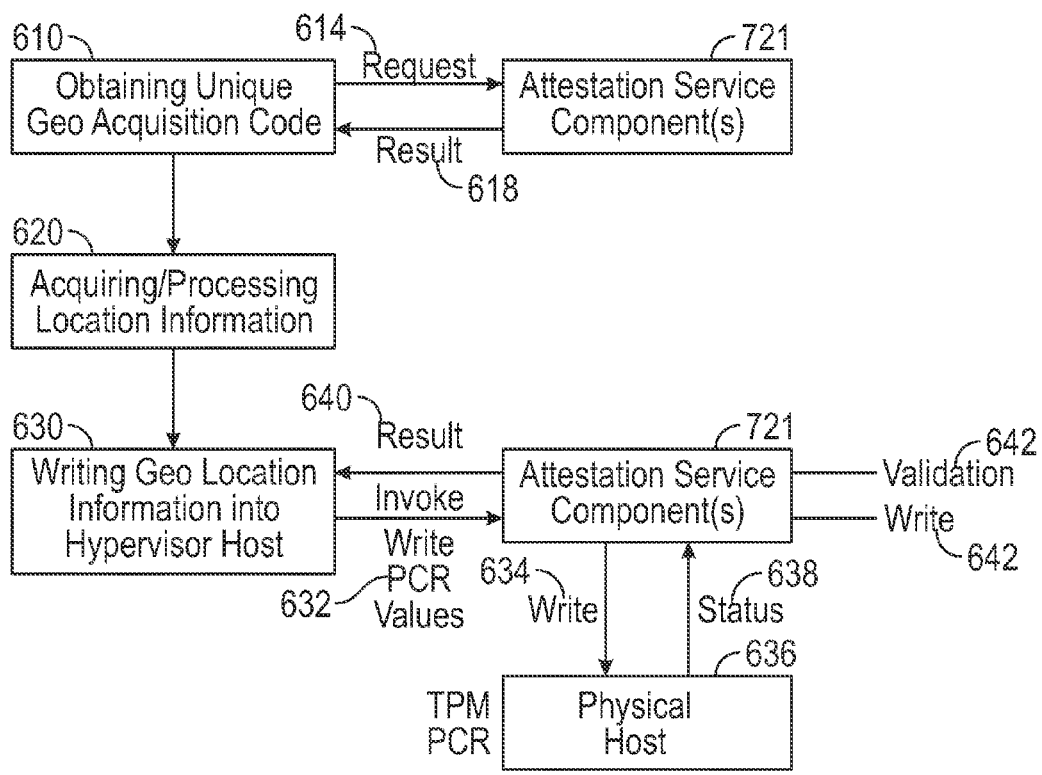
FIG. 6 is a flow diagram illustrating a high level geographic location provisioning process for a physical server consistent with certain aspects related to the innovations herein.

FIG. 6 is a flow diagram illustrating a high level geographic location provisioning process for a physical server, consistent with certain aspects related to the innovations herein. FIG. 6 may be, for example, a more detailed implementation of a provisioning process 703 in FIG. 2. The exemplary provisioning process shown in FIG. 6 begins with obtaining the unique geo acquisition code, at 610. Here, for example, a request for such code may be issued, at 614, to the attestation service component(s) 721, with a result including the initial geo location data being returned at 618. Next, at 620, a step or process of acquiring the verified geo location information may be performed. This step may include or involve various features of validating the initial geo location data and generating the verified geo location data, as set forth in more detail elsewhere herein. Finally, at 630, the verified geo location data may be written to the hypervisor host, such as into a PCR of the TPM.

With regard to writing the verified geo location data, an instruction to invoke a write may be issued, at 632, to the attestation service component(s) 721, which may then write the data 634 into a PCR of a physical host 636. With regard to confirming verified geo location data, the attestation service component(s) 721 may, at 638, obtain the status of the geographic location data in the physical host 636, and provide the result, at 640. Such write and confirmation or validation instructions 642 may be provided to the attestation service component(s) 721 via various entities in the system, such as cloud operating systems 414, cloud management software 530, and the like.

Figure 7:
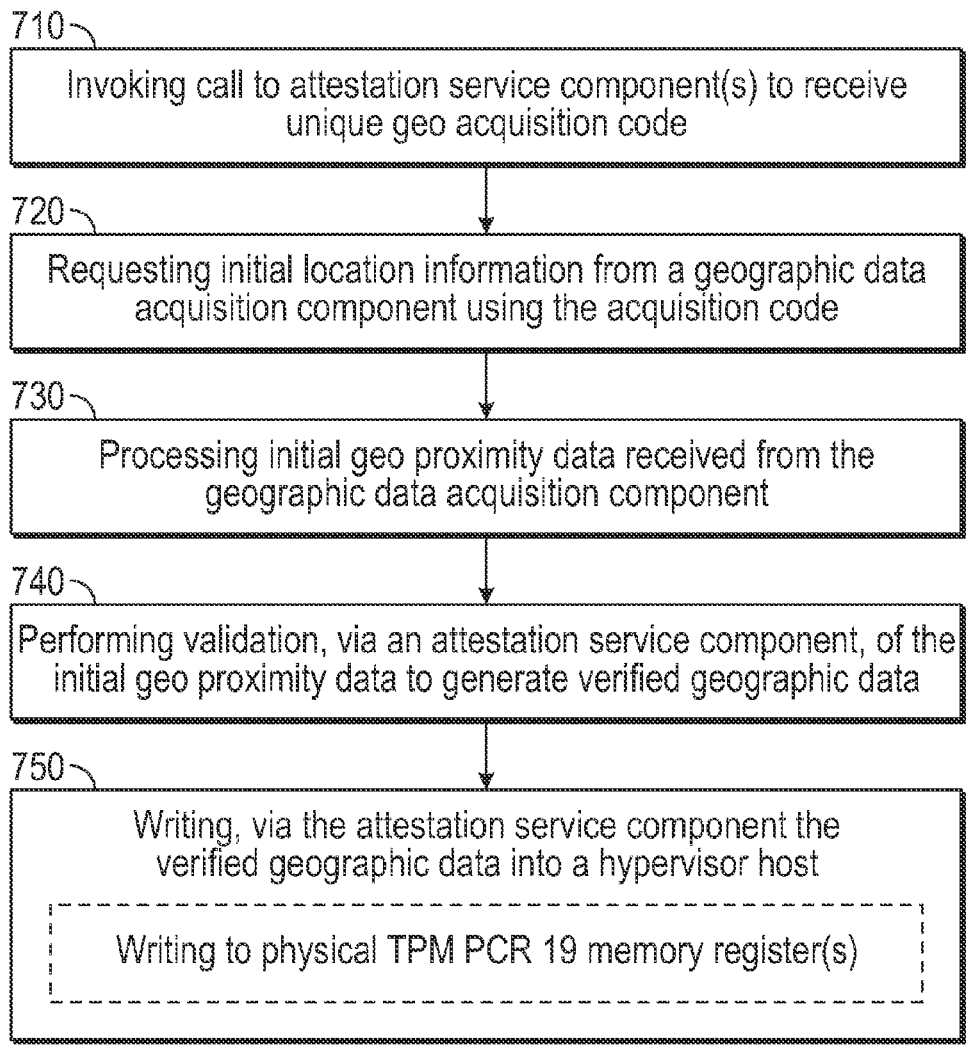
FIG. 7 is a flow diagram illustrating another geographic location provisioning process for a physical server consistent with certain aspects related to the innovations herein.

FIG. 7 is a flow diagram illustrating another geographic location provisioning process for a physical server consistent with certain aspects related to the innovations herein. Referring to FIG. 7, a method for establishing and/or provisioning an actual geographic location of a physical infrastructure device associated with a hypervisor host is shown. Such provisioning may be performed for devices associated with other platforms, hosts or network elements involved with cloud computing, as well. As set forth in FIG. 7, the method may include invoking a call to attestation service component(s) to receive a unique geo acquisition code 710, requesting initial geo location information from a geo data acquisition component using the acquisition code 720, processing initial geo location data received from the geo data acquisition component 730, performing validation, via the attestation service component(s), of the initial geo location data to generate verified geo location data 740, and writing, via the attestation service component(s), the verified geographic data into a hypervisor host 750. Further, with regard to writing the verified geo location data, such data may be written into the physical TPM PCRs of the hypervisor host. Moreover, additional aspects applicable to the steps of FIG. 7 are set forth in more detail in connection with FIG. 8, below.

Figure 8:
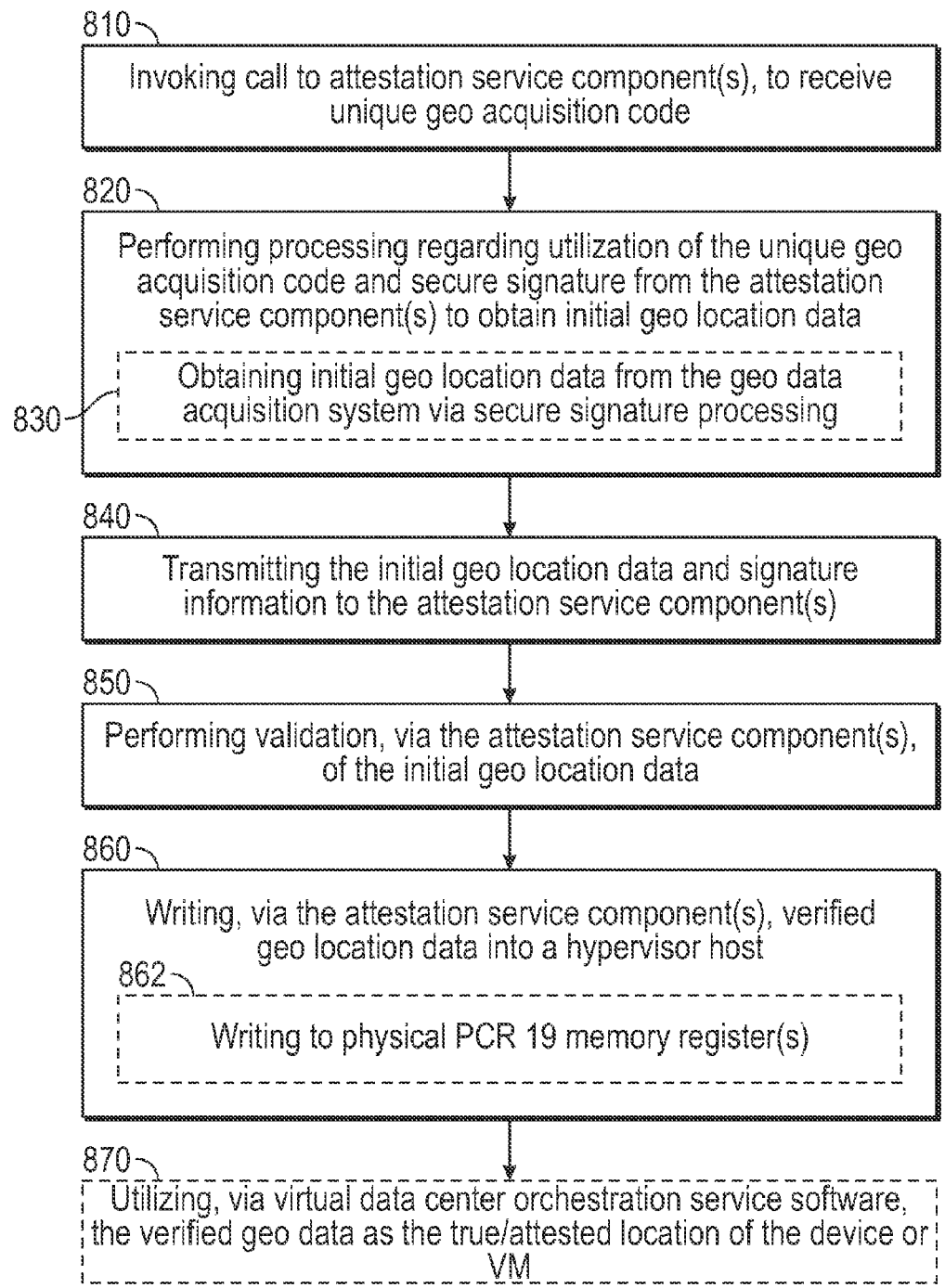
FIG. 8 is a flow diagram illustrating a geographic location provisioning process, which may include aspects involving a mobile application device and/or mobile application software, consistent with certain aspects related to the innovations herein.

FIG. 8 is a flow diagram illustrating a geographic location provisioning process, which may include aspects involving a mobile application device and/or mobile application software, consistent with certain aspects related to the innovations herein. Referring to FIG. 8, such geographic location provisioning may include processes for establishing a geographic location of a physical infrastructure device associated with a hypervisor host or other cloud computing element. These processes for establishing or provisioning such geographic location information may be commenced in a variety of ways.

A special case, applicable in situations where the data center in which a new server or device is deployed deep underground or in a heavily shielded area such that it cannot directly receive communications or location information from GPS satellites, is described first. In situations such as this, for example, a system administrator may begin the geographic location provisioning process via a mobile application device having an enabled GPS receiver. Upon installation of the server, the administrator actuates the mobile application device and/or associated mobile application software to launch the geographic location provisioning process. Here, such software may be, e.g., an embedded app, Web based, or otherwise resident on or distributed in association with the mobile device. The mobile application device or software then provides the administrator a set period of time to bring the mobile device into communication or GPS range to establish initial geographic information of the physical location where the server was deployed.

After such initial mobile location provisioning step, the provisioning process may continue either with or without use of the mobile device/mobile application software. However, for purposes of illustration, some discussion below refers to mobile application software as used in this illustrative early provisioning step.

According to systems and methods herein, a next action taken (potentially with involvement of the mobile application software) may comprise invoking a call to one or more attestation service component(s), at 810, to request a unique geo acquisition code, performing processing regarding utilization of the unique geo acquisition code to obtain initial geo location data 820, transmitting the initial geo location data and related signature information to the attestation service component(s) 840, performing validation, via the attestation service, of the initial geo location data 850 (as explained further below), writing verified geographic data values into a hypervisor host after validation 860, and, optionally, utilizing the verified geographic data values stored in the hypervisor host as true/attested location of physical device location 870. In some implementations, at 820, the initial geo location data may be obtained from the geo data acquisition component via secure signature processing 830, as set forth elsewhere herein.

According to some implementations, at step 860, the verified geographic data may be written into the physical PCRs of the hypervisor host 862. Further, with regard to utilization of the verified geographic data, at 870, virtual data center orchestration service software may be utilized to read the geographic data values stored in the TPM. Such reading and use of geographic data values may be performed by orchestration service software, such as xStream, etc., which may perform such utilization in connection with the attestation service component(s). These verified geographic data values stored in the TPM may then be used to provide the true/attested location of the physical devices, such as virtual machines running on or associated with a hypervisor host, data center or the like.

Additionally, as explained below, the request may be issued securely and the unique geo acquisition code issued/processed at 820 may only be valid for a predefined time. Moreover, as also indicated in connection with FIG. 2, such provisioning process may be repeated at a given frequency by the system owner, e.g., a specified period of minutes, hours, days, at a set time every month, etc.

According to systems and methods herein, the unique geo acquisition code may be valid only for a predefined time in the future. In some implementations, the tolerance of the future time can be configured by a system administrator as a function of various fixed or specified timing information, such as time periods ranging from minutes to hours from the current system time. For example, a predefined time that the geo acquisition code is available may be current time plus a defined number of minutes, hours or seconds. Further, such time period may be defined by a system owner or administrator, and may be based on tolerance requirements for accuracy. The request may also contain an RSA public key for the geographic location provisioning mobile application software that is utilized to encrypt data during the geographic location data acquisition.

According to some implementations, the unique geo acquisition code may be issued, at 820 and elsewhere herein, via the attestation service component(s) and may include attestation service date and time, computer data such as host MAC information, host BIOS serial number, and the RSA public key of the attestation service component(s). In certain implementations, this unique code may be in the format of the attestation date and time (DDMMYYYYSSSS)+host MAC+host BIOS serial number and including the RSA public key. The unique geo acquisition code may be encrypted with an attestation service private key and/or the public RSA key, such as those provided via GPS location application software. In some implementations, such verification or check information may include or involve a RANDOM(6) code or value. Further, the characters of the unique geo acquisition code and an encryption public key may be emailed or otherwise transmitted to the data center owner via the attestation service component(s).

With regard to the handling of initial geo location information, the processing of initial geo location data, at 830, may be performed at or via the data center, may comprise location data such as latitude/longitude or other similar positional data, and/or may be processed or packaged securely using related signature information. Further, specific processing involved with processing and packaging of the initial geo location data may include processing location data (e.g., GPS latitude, longitude, date, time, etc.) acquired via the geo data acquisition system 720 along with the unique geo acquisition code to yield a particular data object package or sequence. The sequence may be signed via the private key and transmitted to the GPS data acquisition system for validation. Upon validation, verified GPS data and a signature from the GPS data acquisition system are obtained and processed for subsequent action.

With regard to validating the initial geo location data 850, exemplary processing here may comprise one or more validation processes. First, for example, implementations may acquire the current time from a valid time source (e.g., such as from the attestation service 721 of FIG. 1) and utilize such time to verify that the current time in the acquired data is within an allotted threshold. As also explained elsewhere, such threshold may be set as "X" seconds, minutes or hours, as defined by the system owner based on accuracy requirements. Here, for example, verifying the current time may involve matching the geo or GPS acquired data/time compared against the time server to attest to accuracy of time within the tolerance X period for time regional determination. In another validation process, implementations may validate that the data was signed by the approved geographic data acquisition system. According to another validation process, implementations may validate that the signed data hash was performed by the public key assigned to the geo acquisition system involved.

Turning to the writing the geographic data values to the hypervisor host, at 860 and elsewhere herein, such write operations may be performed by or via the attestation service component(s). Further, such data may be written to the TPM of the hypervisor host. In various systems and methods herein, for example, such write processing may include secure signature of the data using a signing key of the attestation service component(s). Additionally, such data may be stored in TPM PCRs of the physical hypervisor host, at 862. Again, according to some implementations, writing to a PCR may only occur after various validation processing 850 is performed, as set forth in more detail below.

In general, the innovations herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on one or more servers, such servers may include or involve components such as CPU, RAM, etc., such as those found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where elements are connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media, though does not encompass transitory media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise non-transitory computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Furthermore, aspects may be embodied in microprocessors having software-based circuit emulation, discrete logic (sequential and combinatorial), custom devices, fuzzy (neural) logic, quantum devices, and hybrids of any of the above device types.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), though do not encompass transitory media.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A method for provisioning physical geographic location of a physical infrastructure device associated with a hypervisor host, the method comprising:
performing processing to obtain initial geo location data of the device, including:
invoking one or more attestation service component(s) to issue a unique geo acquisition code that is only valid for a predefined time;
sending a request for the initial geo location data including the acquisition code to a geographic data acquisition component; and
receiving the initial geo location data from the geographic data acquisition component in response to the request, the initial geo location data comprising location, date, time data, and the acquisition code, and being signed by a key of the geo data acquisition component;
determining verified geo location data of the device by performing validation, via the attestation service component(s), of the initial geo location data to provide the verified geo location data upon successful validation;
writing, via the attestation service component(s), the verified geo location data into a Hardware Security Module of the hypervisor host.

2. The method of claim 1 wherein the unique geo acquisition code includes date, Host MAC, Host BIOS SERIAL NUMBER, and verification or check information.

3. The method of claim 2 wherein the verification or check information includes or involves a public key of the attestation service component(s).

4. The method of claim 2 wherein the verification or check information includes or involves a RANDOM(6) code or value.

5. The method of claim 1 further comprising encrypting the initial geo location data transmitted from the geographic data acquisition component with a private key of the attestation service component and/or a public key of geographic location application software or mobile application software.

6. The method of claim 1 wherein the performing processing to obtain the initial geo location data of the device, further includes, at the geographic data acquisition component:
processing preliminary geo location data along with the acquisition code to provide a concatenated data object or sequence, the data object or sequence including latitude, longitude, date, time, and the acquisition code;
signing of the data object or sequence by the geographic data acquisition component using a private key;
transmitting the signed data object or sequence to a provisioning component for validation and writing of the verified geo location data into the hypervisor host.

7. The method of claim 1 wherein the performing validation comprises:
obtaining current time from a valid time source; and
utilizing the obtained present time to verify that the time data within the received initial geo location data is within an allotted threshold.

8. The method of claim 7 wherein the valid time source is the attestation service component(s).

9. The method of claim 7 wherein the allotted threshold is set as a fixed number of hours, minutes and/or seconds defined by a system owner based on accuracy requirements.

10. The method of claim 1 wherein the performing validation comprises:
validating that the geographic data acquisition component which signed the initial geo location data is an approved provider of location information.

11. The method of claim 1 wherein the performing validation comprises:
validating that the signing of the initial geo location data was performed by a public key assigned to the geographic data acquisition component.

12. The method of claim 1 further comprising:
utilizing, via virtual data center orchestration service software, the verified geographic data values stored in the Hardware Security Module as true and attested location of virtual machines running on or associated with the hypervisor host.

13. The method of claim 12 wherein the virtual data center orchestration software includes or utilizes xStream application(s).

14. The method of claim 1 wherein the provisioning of the physical geographic location is performed by provisioning application software executed via the device's pixi boot and/or physical media insertion process.

15. The method of claim 1 wherein the predefined time is a current time plus a specified period of additional time.

16. The method of claim 15 wherein the specified period of additional time is defined as a function of tolerance requirements for accuracy of a system owner using the verified geo location data.

17. The method of claim 1 wherein characters of the unique geo acquisition code and an encryption public key are emailed to an owner of a data center operating the hypervisor host via the attestation service.

18. The method of claim 1 wherein the Hardware Security Module comprises a Trusted Platform Module.

19. The method of claim 18 wherein the Trusted Platform Module executes using TXT technology.

20. The method of claim 1 wherein the geo location data includes GPS data and the geographic data acquisition component is a GPS acquisition component.

21. The method of claim 1 further comprising:
managing a virtual environment associated with the hypervisor host via virtualization management software that utilizes a set of allowed geo tag locations configured according to proscribed geo fencing policy information, the proscribed policy information including location(s) where one or more associated virtual machines may launch and/or perform computing operations based on one or more computing resource requirements.

22. The method of claim 21 wherein the one or more computing resource requirements include one or both of a legal requirement and/or a compliance related requirement.

23. The method of claim 21 further comprising, in connection with a compute migration:
checking the geo fencing policy information to ensure that a computing workload can launch in a target geographic location;
determining whether or not the workload is allowed; and
disallowing the computing resource migration when it is determined that the workload cannot be launched in the target geographic location.

24. The method of claim 1 further comprising:
processing information regarding enforcement of geographic execution of a virtual machine guest based on the verified geo location data.

25. The method of claim 1 further comprising:
processing information regarding enforcement of geographic execution of a virtual machine guest based on the verified geo location data and proscribed policy information including location(s) where one or more associated virtual machines may launch and/or perform computing operations.

26. The method of claim 1 further comprising securely processing the geo location and time data using one or more signatures or keys to provide confirmation of a real physical location of the device running on the hypervisor host.

27. The method of claim 1 wherein, in instances where the device cannot directly receive communications or location information from GPS satellites, the performing processing to obtain initial geo location data of the device further includes a first step comprising:
providing an actual geographic position of the device via a mobile application device having an enabled GPS receiver and an associated mobile application software process.

28. The method of claim 27 wherein the associated mobile application software process includes:
launching the geographic location provisioning process via the mobile application device and/or associated mobile application software upon installation of the server; and
providing the administrator a set period of time to bring the mobile device into communication or GPS range to establish initial geographic information of the physical location where the server was deployed.

29. The method of claim 1 wherein, as a function of analyzing time relativity based on attested times of geographic tagging provisioning activity relative to physical device time, GPS data acquisition time, acquisition system device time, and unique acquisition code data, high integrity of the verified geo location data is achieved.

30. A method for provisioning physical geographic location of a physical infrastructure device associated with a hypervisor host, the method comprising:
invoking one or more attestation service component(s) to issue a unique geo acquisition code that is only valid for a predefined time;
sending a request for initial geo location data including the acquisition code to a geographic data acquisition component;
processing the initial geo location data from the geographic data acquisition component in response to the request, the initial geo location data comprising location, date, time data, and the acquisition code, and being signed by a key of the geo data acquisition component;
performing validation, via the attestation service component(s), of the initial geo location data to provide the verified geo location data upon successful validation;
writing, via the attestation service component(s), the verified geo location data into the hypervisor host.

31. The method of claim 30 wherein the verified geo location data is written into a Hardware Security Module of the hypervisor host.

32. The method of claim 31 wherein the verified geo location data is written into a Trusted Platform Module of the Hardware Security Module.

33. The method of claim 32 wherein the verified geo location data is written into a PCR of the Trusted Platform Module.

34. A method for provisioning physical geographic location of a physical infrastructure device associated with a hypervisor host, the method comprising:
invoking one or more attestation service component(s) to issue a unique geo acquisition code that is only valid for a predefined time;
performing processing regarding utilization of the unique geo acquisition code and secure signature from the attestation service component(s) to obtain initial geo location data from a geographic data acquisition component;
transmitting the initial geo location data and the signature to the attestation service component(s);
performing validation, via the attestation service component(s), of the initial geo location data to provide the verified geo location data upon successful validation;
writing, via the attestation service component(s), the verified geo location data into the hypervisor host.

35. The method of claim 34 further comprising utilizing, via virtual data center or orchestration service software, the verified geo location data as a true and attested location of the device.

36. The method of claim 34 wherein the verified geo location data is written into a Hardware Security Module of the hypervisor host.

37. The method of claim 36 wherein the verified geo location data is written into a Trusted Platform Module of the Hardware Security Module.

38. The method of claim 37 wherein the verified geo location data is written into a PCR of the Trusted Platform Module.

39. A method for establishing a physical geographic location of a data processing device associated with a hypervisor host, the method comprising:
receiving the data processing device at a data center;
integrating the device into a physical rack of the data center; and
performing a geographic location provisioning process in accordance with claim 1 to establish the physical geographic location of the device.

40. The method of claim 39 further comprising performing repeated attestation of the device's location.

41. The method of claim 40 wherein the repeated attestation is performed periodically based on a system defined frequency.

42. The method of claim 40 wherein the repeated attestation is performed when a trigger event is initiated or occurs.

43. The method of claim 39 wherein, in instances where the device cannot directly receive communications or location information from GPS satellites, the performing processing to obtain initial geo location data of the device further includes a first step comprising:
providing an actual geographic position of the device via a mobile application device having an enabled GPS receiver and an associated mobile application software process.

44. The method of claim 43 wherein the associated mobile application software process includes:
launching the geographic location provisioning process via the mobile application device and/or associated mobile application software upon installation of the server; and providing the administrator a set period of time to bring the mobile device into communication or GPS range to establish initial geographic information of the physical location where the server was deployed.

45. A system comprising:

at least one hypervisor host with one or more physical infrastructure devices; and one or more processing devices and/or computer readable media containing computer readable instructions executable by one or more processors to provision the hypervisor host with actual geographic location information of a physical infrastructure device, the instructions executable for:

performing processing to obtain initial geo location data of the device, including:

invoking one or more attestation service component(s) to issue a unique geo acquisition code that is only valid for a predefined time;

sending a request for the initial geo location data including the acquisition code to a geographic data acquisition component; and receiving the initial geo location data from the geographic data acquisition component in response to the request, the initial geo location data comprising location, date, time data, and the acquisition code, and being signed by a key of the geo data acquisition component;

determining verified geo location data of the device by performing validation, via the attestation service component(s), of the initial geo location data to provide the verified geo location data upon successful validation;

writing, via the attestation service component(s), the verified geo location data into a Hardware Security Module of the hypervisor host.

46. One or more computer readable media containing computer readable instructions executable by one or more processors to provision a hypervisor host with actual geographic location information of a physical infrastructure device associated with the hypervisor host, the instructions executable for:

performing processing to obtain initial geo location data of the device, including:

invoking one or more attestation service component(s) to issue a unique geo acquisition code that is only valid for a predefined time;

sending a request for the initial geo location data including the acquisition code to a geographic data acquisition component; and receiving the initial geo location data from the geographic data acquisition component in response to the request, the initial geo location data comprising latitude, longitude, date, time data, and the acquisition code, and being signed by a key of the geo data acquisition component;

determining verified geo location data of the device by performing validation, via the attestation service component(s), of the initial geo location data to provide the verified geo location data upon successful validation; and writing, via the attestation service component(s), the verified geo location data into a Hardware Security Module of the hypervisor host.

* * * * *